United States Patent
Ylivainio

(10) Patent No.: US 9,361,284 B2
(45) Date of Patent: Jun. 7, 2016

(54) CAUSING DISPLAY OF COMMENTS ASSOCIATED WITH AN OBJECT

(75) Inventor: Risto Matias Ylivainio, Vancouver (CA)

(73) Assignee: Nokia Technologies Oy, Espoo (FI)

( * ) Notice: Subject to any disclaimer, the term of this patent is extended or adjusted under 35 U.S.C. 154(b) by 178 days.

(21) Appl. No.: 13/372,167

(22) Filed: Feb. 13, 2012

(65) Prior Publication Data

US 2013/0044050 A1  Feb. 21, 2013

(30) Foreign Application Priority Data

Feb. 11, 2011  (GB) .................................. 1102470.0

(51) Int. Cl.
- G09G 5/00 (2006.01)
- G06F 17/24 (2006.01)
- G06F 3/0481 (2013.01)

(52) U.S. Cl.
CPC ............ G06F 17/241 (2013.01); G06F 3/0481 (2013.01)

(58) Field of Classification Search
CPC .............................. G06F 17/241; G06F 3/0481
See application file for complete search history.

(56) References Cited

U.S. PATENT DOCUMENTS

| | | | | |
|---|---|---|---|---|
| 6,466,237 | B1* | 10/2002 | Miyao et al. .................. | 715/838 |
| 6,687,878 | B1 | 2/2004 | Eintracht et al. | |
| 8,132,102 | B2* | 3/2012 | De Medeiros ................ | 715/715 |
| 2002/0007265 | A1 | 1/2002 | Yamada | |
| 2007/0271331 | A1* | 11/2007 | Muth ................ | G06F 17/30058 709/203 |
| 2007/0271502 | A1 | 11/2007 | Bedi et al. | |
| 2008/0042978 | A1* | 2/2008 | Perez-Noguera ............. | 345/168 |
| 2008/0062137 | A1 | 3/2008 | Brodersen et al. | |
| 2008/0119235 | A1 | 5/2008 | Nielsen et al. | |
| 2008/0204423 | A1* | 8/2008 | Kim .................... | G06F 3/04886 345/173 |
| 2008/0259045 | A1* | 10/2008 | Kim ...................... | G06F 3/0486 345/173 |
| 2008/0278481 | A1* | 11/2008 | Aguera y Arcas ................ | G06F 17/30265 345/419 |
| 2009/0158154 | A1* | 6/2009 | Kim .............................. | 715/716 |
| 2009/0167783 | A1* | 7/2009 | Fujinaga ....................... | 345/619 |
| 2009/0204882 | A1* | 8/2009 | Hollander et al. ............ | 715/230 |
| 2009/0289917 | A1* | 11/2009 | Saunders ...................... | 345/174 |
| 2010/0088621 | A1* | 4/2010 | Paley ............................ | 715/764 |

(Continued)

FOREIGN PATENT DOCUMENTS

| CN | 101681225 A | 3/2010 |
|---|---|---|
| EP | 1148412 A2 | 10/2001 |

(Continued)

OTHER PUBLICATIONS

Search Report received for corresponding United Kingdom Patent Application No. 1102470.0, dated Jun. 3, 2011, 4 pages.

(Continued)

*Primary Examiner* — Seokyun Moon
*Assistant Examiner* — Josemarie G Acha, III
(74) *Attorney, Agent, or Firm* — Alston & Bird LLP

(57) ABSTRACT

Apparatus is configured to cause to be displayed, in a first area of a display, an object and to cause to be displayed, in a second area of the display, a first comment associated with the object, wherein the second area is in a fixed location relative to the first area. The apparatus is responsive to a first dynamic tactile user input within the second area of the display to cause the first comment to be at least partially hidden and to cause to be displayed, in the second area of the display, a second comment that was not visible prior to the first dynamic tactile user input without moving the object on the display.

32 Claims, 6 Drawing Sheets

(56) References Cited

U.S. PATENT DOCUMENTS

| | | | |
|---|---|---|---|
| 2010/0107087 A1* | 4/2010 | De Medeiros | 715/748 |
| 2010/0245252 A1* | 9/2010 | Ghassabian | G06F 3/0233 345/169 |
| 2010/0262928 A1 | 10/2010 | Abbott | |
| 2010/0306703 A1* | 12/2010 | Bourganel et al. | 715/823 |
| 2010/0312702 A1* | 12/2010 | Bullock | 705/44 |
| 2010/0318893 A1 | 12/2010 | Matthews et al. | |
| 2011/0074797 A1* | 3/2011 | Inoue | G06F 1/1626 345/522 |
| 2011/0096320 A1* | 4/2011 | Krupkin | G01S 7/414 356/27 |
| 2011/0157046 A1* | 6/2011 | Lee et al. | 345/173 |
| 2011/0163969 A1* | 7/2011 | Anzures et al. | 345/173 |
| 2011/0185301 A1* | 7/2011 | Geller et al. | 715/769 |
| 2012/0166453 A1* | 6/2012 | Broder | 707/752 |
| 2012/0198332 A1* | 8/2012 | Shimada | G06F 17/21 715/272 |

FOREIGN PATENT DOCUMENTS

| | | |
|---|---|---|
| EP | 1976242 A1 | 10/2008 |
| EP | 2071577 A1 | 6/2009 |

OTHER PUBLICATIONS

Extended European Search Report received for corresponding European Patent Application No. 12152233.8, dated Jun. 29, 2012, 11 pages.

Chinese Office Action from corresponding Chinese Patent Application No. 201210032363.4, dated Apr. 3, 2014, 8 pages.

\* cited by examiner

CAUSING DISPLAY OF COMMENTS ASSOCIATED WITH AN OBJECT

FIELD OF THE APPLICATION

This invention relates to method and apparatus for causing display of comments associated with an object.

BACKGROUND OF THE APPLICATION

Social networking media, in particular social networking websites, have seen a rapid rise in popularity over recent years. A feature offered by many of these websites is the ability to host an image or other electronic file on a web page and allow others to write comments about the image or file that are then displayed with the image or file.

SUMMARY

A first aspect of the specification provides apparatus configured: to cause to be displayed, in a first area of a display, an object;

to cause to be displayed, in a second area of the display, a first comment associated with the object, wherein the second area is in a fixed location relative to the first area; and to be responsive to a first dynamic tactile user input within the second area of the display to cause the first comment to be at least partially hidden and to cause to be displayed, in the second area of the display, a second comment that was not visible prior to the first dynamic tactile user input without moving the object on the display.

The apparatus may be further responsive to a second dynamic tactile user input within the second area of the display to cause the second comment to be at least partially hidden and to cause the first comment to be re-displayed.

The first dynamic tactile user input within the second area of the display may generally follow a shape of the second area of the display.

The second area of the display may surround the first area of the display.

The first comment may be the comment which has been most recently associated with the object.

In an initial display configuration, the first comment may be displayed in preference to at least a part of the second comment.

The second area of the display may surround the first area of the display, the comments may be provided in a sequence around the first area of the display such that comments later in the sequence are displayed in preference to comments earlier in the sequence which are at the same part of the second area of the display, and the first and second dynamic tactile user inputs may trace the shape of the second area of the display to reveal or hide comments depending on the direction of movement of the dynamic tactile input.

The second dynamic tactile user input may be in an opposite direction to the first dynamic tactile user input.

A second aspect of the specification provides a method comprising:

displaying, in a first area of a display, an object;

displaying, in a second area of the display, a first comment associated with the object, wherein the second area is in a fixed location relative to the first area; and responding to a first dynamic tactile user input within the second area of the display by causing the first comment to be at least partially hidden and displaying, in the second area of the display, a second comment that was not visible prior to the first dynamic tactile user input without moving the object on the display.

The specification also provides a computer program comprising instructions that when executed by computer apparatus control it to perform the method of any of claims 9 to 16.

A third aspect of the specification provides apparatus comprising:

means for displaying, in a first area of a display, an object;

means for displaying, in a second area of the display, a first comment associated with the object, wherein the second area is in a fixed location relative to the first area; and means for responding to a first dynamic tactile user input within the second area of the display by causing the first comment to be at least partially hidden and displaying, in the second area of the display, a second comment that was not visible prior to the first dynamic tactile user input without moving the object on the display.

A fourth aspect of the specification provides non-transitory computer-readable storage medium having stored thereon computer-readable code, which, when executed by computing apparatus, causes the computing apparatus to perform a method comprising:

displaying, in a first area of a display, an object;

displaying, in a second area of the display, a first comment associated with the object, wherein the second area is in a fixed location relative to the first area; and responding to a first dynamic tactile user input within the second area of the display by causing the first comment to be at least partially hidden and displaying, in the second area of the display, a second comment that was not visible prior to the first dynamic tactile user input without moving the object on the display.

A fifth aspect of the specification provides apparatus, the apparatus having at least one processor and at least one memory having computer-readable code stored thereon which when executed controls the at least one processor:

to cause to be displayed, in a first area of a display, an object;

to cause to be displayed, in a second area of the display, a first comment associated with the object, wherein the second area is in a fixed location relative to the first area; and to be responsive to a first dynamic tactile user input within the second area of the display to cause the first comment to be at least partially hidden and to cause to be displayed, in the second area of the display, a second comment that was not visible prior to the first dynamic tactile user input without moving the object on the display.

BRIEF DESCRIPTION OF THE DRAWINGS

Embodiments will now be described, by way of example only, with reference to the accompanying drawings, in which.

DETAILED DESCRIPTION OF THE DRAWINGS

Figure 1:
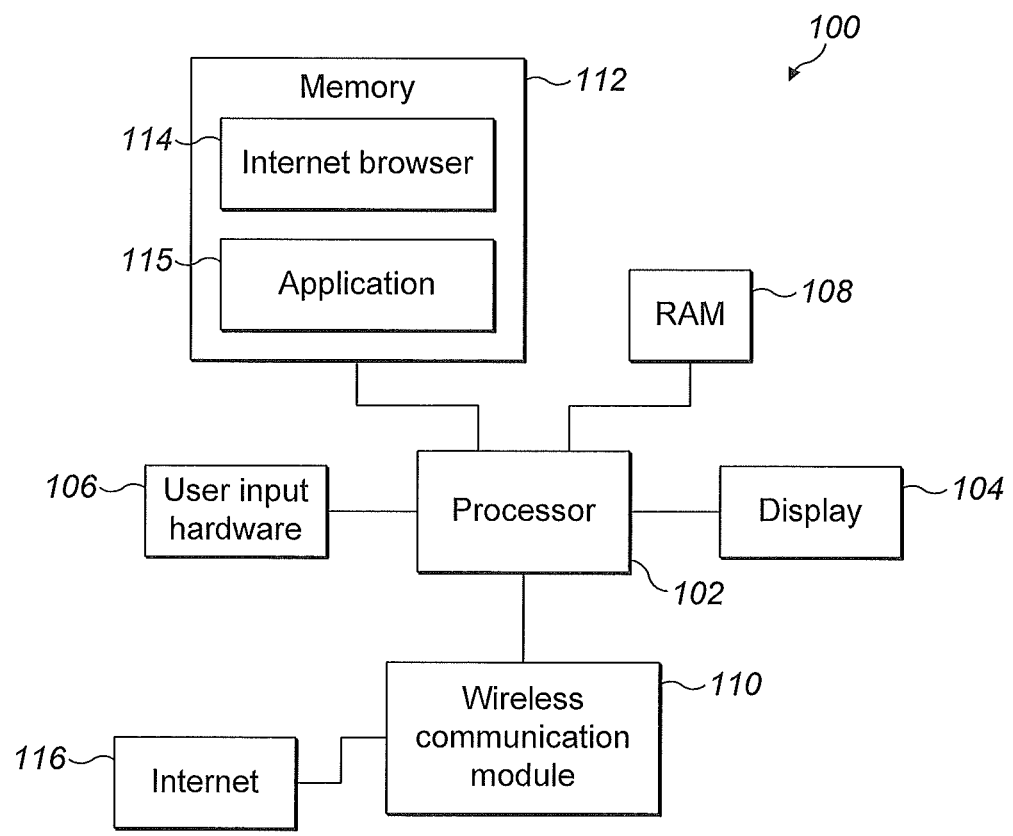
FIG. 1 is a schematic diagram illustrating components of an exemplary computing device suitable for implementing embodiments.

Referring firstly to FIG. 1, a computing device 100 is shown. The computing device 100 has a processor 102. Connected to the processor 102 are a display 104, at least one form of user input hardware 106, a transient memory, such as Random Access Memory (RAM), 108, a communications module 110, and a memory 112. The memory 112 stores an internet browser software program 114 and an application 115. The communication module 110 may be configured to send and receive data via a network, such as the internet 116. The memory 112 may also store an operating system (not shown) of the computing device 100 as well as computer code associated with the other components (not shown) and further software modules (not shown).

The computing device 100 may be a desktop, a laptop or a tablet computer, a computer console, a television, a smart phone, a PDA, a portable gaming device or any other suitable type of electronic device.

The processor 102 is connected to, and controls operation of, all of the other components. The processor 102 may be an integrated circuit of any kind. The processor 102 may access the RAM 108 in order to process data and may control the storage of data in memory 112. Memory 112 may be a non-volatile memory of any kind such as a Read Only Memory (ROM), a flash memory and a magnetic drive memory.

The display 104 may be an LCD, plasma or LED display of any kind. The display 104 may be a touch sensitive display having a tactile interface part and a displaying part. The display 104 may be integral with the computing device 100, for example in the case of a tablet computer or smart phone. Alternatively, the display 104 may be separate from the computing device 100, i.e. it may form part of a peripheral device. In either case, the device 100 may have a port (not shown) for connecting an external display. The RAM 108 may be a RAM of any type, for example Static RAM (SRAM), Dynamic RAM (DRAM) or a flash memory.

The computing device 100 may have one or more pieces of user input hardware 106, represented generally in FIG. 1 by user input hardware 106. The user input hardware 106 may include, but is not limited to, a keyboard, a mouse, a trackpad, a joystick or controller, a movement or proximity detector, a remote control or a microphone. Alternatively or in addition, user inputs may be received at the display 104, in embodiments in which the display 104 is a touch sensitive display.

The communication module 110 may be configured to communicate via a cable or wirelessly. The communication module 110 may be configured to exchange data via the internet 116, as shown, and/or via a wireless or wired network such as GSM, CDMA, UMTS, Bluetooth and IEEE 802.11 (Wi-Fi).

The processor 102 may, under control of the internet browser 114, cause text, images and videos to be displayed on the display 104. The processor 102 may also, under control of the internet browser 114, cause the communication module 110 to download content for display on the display 104. The processor may be controlled by application 115 to display text, images and videos and to utilise communication module 110 to download this content. The application 115 may be programmed specifically to display images and text stored externally. The application 115 may be associated with a particular website. For instance, the application 115 may be arranged to provide a user with access to information from a social networking website. The social networking website may be, for example, "Ovi Share", managed by Nokia Corporation. The processor 102 is responsive to inputs at user input hardware 106 to cause a change in the displayed content or to cause different content to be downloaded and displayed.

Figure 2:
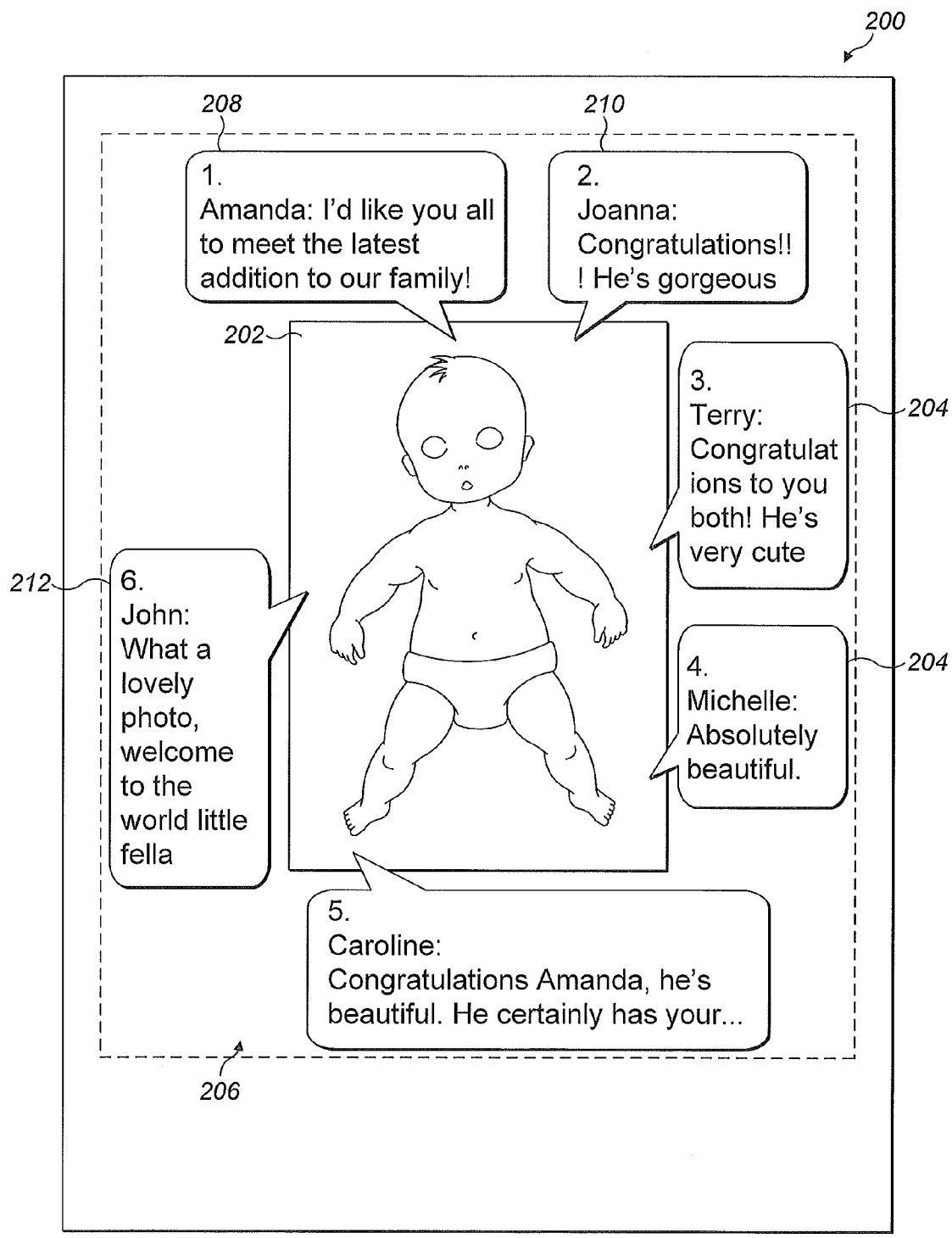
FIG. 2 is a screen shot from the display of the computing device of FIG. 1.
Figure 3:
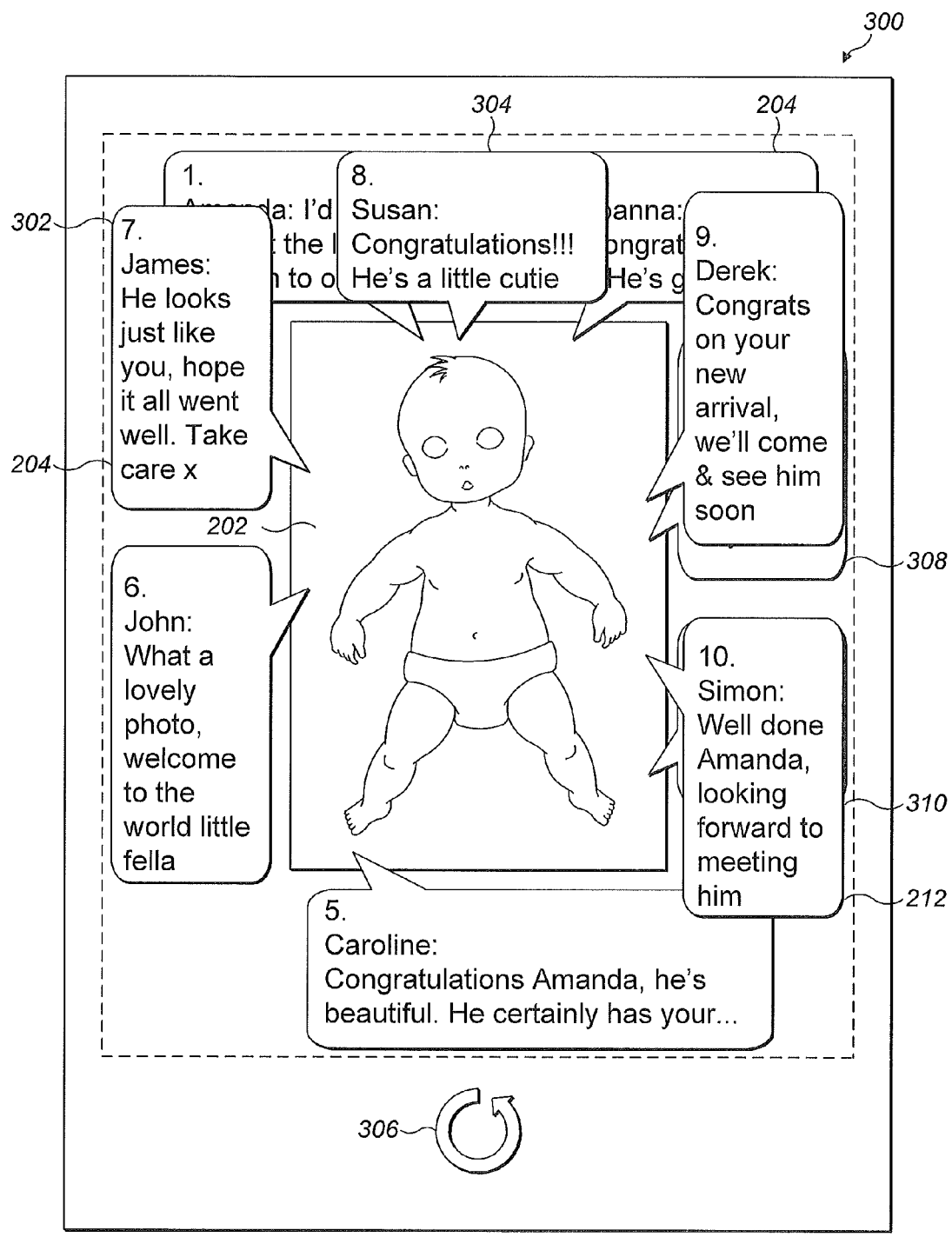
FIG. 3 is a further screen shot from the display of the computing device of FIG. 1 showing an initial configuration.
Figure 4:
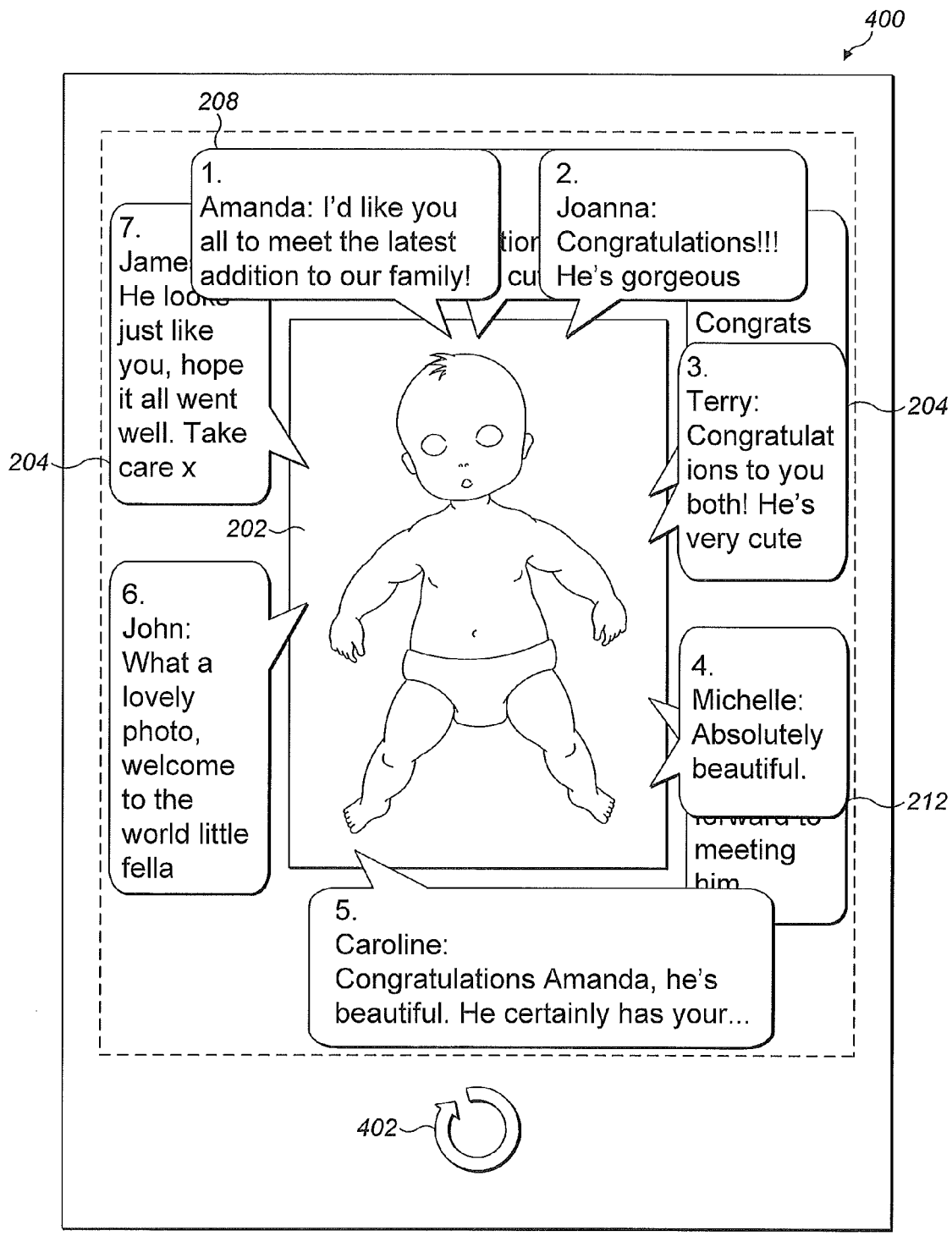
FIG. 4 is a further screen shot from the display of the computing device of FIG. 1 showing a secondary configuration.

In the embodiments of FIGS. 2-4 described below, the display 104 is a touch screen display configured to receive tactile user inputs.

Referring now to FIG. 2, a screenshot 200 is shown. The screenshot 200 shows an image 202. Disposed around the outside edge of the image 202 are comments 204. Both the image 202 and comments 204 are contained within a predefined area 206 of the screenshot 200. The image 202 is approximately central in the predefined area 206 and occupies a fraction of the area.

A first comment 208 appears above the image 202, near the top left hand corner of the predefined area 206. A second comment 210 is located to the right of the first comment 208. In general, each new comment 204 is added clockwise of the previous comment around the outside of the image 202. A latest comment 212 is the comment which has been added most recently. In FIG. 2, this is the sixth comment 212.

The screenshot 200 may be displayed on the display 104 of the computing device 100, or may be displayed on an external screen connected to the computing device 100. The image 202, depicted in FIG. 2 as a baby, could alternatively be a video. A video may be represented by a black screen image or by the first frame of the video, optionally with a play icon overlaid, when the video is not being played. In some other embodiments the object being commented on could be another type of media, such as audio. For example, media player (audio player) control buttons such as a play, stop and volume control buttons may be arranged approximately centrally in the predefined area 206, and a user may control playback of the audio file via these controls. The object may instead be an executable, such as a game, for instance in Flash™ or Java™. The term "object" may be used to describe an image, video, audio file or other suitable type of media or executable which other users may comment on. In this audio example, the object is an interface, for instance including controls and a progress bar, of a media player that provides access to the audio.

The comments 204 are comments which pertain to the image 202 and which have been associated with (or "posted" against) the image 202. Each comment 204 may contain a posting number which ascends sequentially with each new comment 204. In some embodiments, a user name of a user who has posted the comment 204 may appear within the comment 204, optionally along with a date and/or time of the posting. Each comment 204 may contain text, hyperlinks, emoticons, images, animations and/or videos.

The image 202 may be embedded in a web page, for example a web page provided by a social networking or photograph storage website. Such websites may host the image 202 by storing a copy and may allow others to post comments 204 to be displayed with the image 202. A list of persons permitted to view the image 202 and to add comments 204 to the image 202 may be set by the user who uploaded the image 202 to the website. Such a list may include a list of individual users, a group or groups of other users, or all users and visitors of the hosting website. The lists of those allowed to view the image 202 and those allowed to post comments 204 about the image 202 may be different. The web page hosting the image 202 and comments 204 may be viewed using the internet browser software 114 stored in the memory 112 of the computing device 100. For example, the image 202 and comments 204 may be embodied in a Java™ applet, a Flash™ or Silverlight™ program or in HTML5 code. This program or code may be downloaded to the computing device 100 when a user of the computing device 100 navigates to the web page containing the image 202. When new comments 204 intended for posting with the image 202 are received by the hosting website, the program is updated by the hosting website. The updated version of the program may be sent periodically to computing devices 100 which are viewing the web page or only when the webpage is refreshed by a computing device 100.

A user may post new comments 204 with an image 202 using the computing device 100. A user may interact with user input hardware 106 and/or a touch sensitive display 104 to compose a comment 204 that they wish to be posted with the image 202. The processor 102 may then be controlled by the internet browser 114 or the application 115 to send the comment 204 to the website hosting the image 202 and comments 204. A program incorporating the image 202 and comments 204 may then be updated to include the new comment 204.

In the embodiment of FIG. 2, a first comment 208 has been posted by the user who uploaded the image. The first comment 208 appears above the image 202, near the top left hand corner of the predefined area 206, however the position of the first comment 208 is not particularly limiting. A second comment 210 has been posted by a different user and is located clockwise of the first comment 208. Each comment 204 is contained within an outline such as a box or speech bubble. Each comment 204 may be of a different length and the boxes may be of variable sizes in order to accommodate the comments 204 whilst remaining within the predefined area 206. However a maximum size of comment box may be set. If a user posts a comment 204 which is long, as is for example the fifth comment in FIG. 2, the comment space allocated for that comment 204 may not be large enough to display all of the comment 204. In these cases, an indication that the comment 204 is incomplete may appear within the comment, such as an arrow or other symbol, or an ellipsis ( . . . ) after the last displayed character of the comment 204. A user who has permission to view the image 202 may view all of a comment 204 which is too long to be fully displayed by selecting the comment 204 using user input hardware 106. Selecting the comment 204 may then cause the entire comment 204 to be displayed. When selected, a comment 204 may be maximised such that it fills substantially the whole display 200. Alternatively, the comment may be expanded such that all of the comment can be seen and at least a part of the image 202 may still be visible. In some embodiments, the comment box containing the long comment 204 may be highlighted or may have some other visually distinguishing feature in order to indicate to a user that the comment 204 can be expanded.

Referring now to FIG. 3, a further screenshot 300 is shown. In screen shot 300, a seventh comment (302), an eighth comment (304), a ninth comment 308 and a tenth comment 310 have been posted. However, the first six comments take up substantially all of the space within the predefined area 206 surrounding the image 202. Therefore, the seventh to tenth comments (302, 304, 308, 310) are displayed in preference to the earlier comments. The seventh comment 302 is positioned clockwise of the sixth comment, and covers a portion of the first comment 208. The eighth comment 304 is positioned clockwise of the seventh comment 302 and covers another portion of the first comment 208 and a portion of the second comment 210. Some portions of covered comments 204 may be visible through gaps between consecutive comments 204. A latest comment 212 is the comment which has been added most recently. In FIG. 3, the tenth comment 310 is also the latest comment 212. Where some portions of covered comments 204 are visible through gaps between consecutive comments 204, a user may experience difficulty in distinguishing the top layer of comments 204 from those which are partially covered. In some embodiments, the comments 204 which are partially covered may be faded. The fading of the partially covered comments 204 may comprise reducing the hue, brightness or shade of the comment 204 and/or comment box. The fading of partially covered comments 204 causes the top layer of comments 204 to visually stand out and causes the partially covered comments 204 to be less distracting for a user.

The exact number of comments 204 which can be posted around the image 202 before overlap of the comments 204 occurs is not limiting. For example, many short comments 204 may be arranged around the image 202, or only a few longer comments 204. When overlapping of the comments 204 occurs, several short comments may be covered by one longer comment 204. Conversely, several short comments 204 may each cover only a portion of a longer comment 204.

In some embodiments, the screenshot 300 may, when comments 204 posted with the image 202 overlap such that some older comments 204 are no longer wholly visible, display a user input indicator 306. The user input indicator 306 may be displayed only when comments 204 posted with the image 202 overlap such that some older comments 204 are no longer wholly visible. The user input indicator 306 may indicate to a viewer of the screenshot 300 that the computing device 100 is responsive to a user input to change the displayed content.

In some embodiments, the display 104 is a touch sensitive display responsive to a tactile user input. The user input indicator 306 may be an arrow shaped as a circle or spiral in order to indicate that if a user performs a generally circular movement on the display 104 with a finger or stylus, a change in the displayed content will result. For example, the user input indicator 306 may be an incomplete circular arrow pointing in an anti-clockwise direction. The processor 102 is configured to detect when a user draws an anti-clockwise circle or a portion of a circle on the touch sensitive display 104. In response, the more recently posted comments 204 are caused to move backwards in the display order and older comments 204 are caused to move forward in the display order. Therefore, older comments 204 become visible and cover the more recent comments 204. The touch sensitive display 104 may be responsive to a user input on or near the user input indicator 306 itself, or it may be responsive to a user input anywhere on the screen.

In some embodiments, the touch sensitive display may be responsive to a user input over the comments 204. This provides an intuitive interface for a user of the computing device 100 as new comments are posted in a clockwise direction and older comments can be viewed by providing a touch input in an anti-clockwise direction. In these embodiments, a location at which a change in which comments overlay other comments coincides with a current location of the user input.

The user input indicator 306 may, in some embodiments, be accompanied by a label (not shown). For example the label may read "show older posts", to further indicate the responsiveness of the computing device 100 to a user input. The user input indicator 306 may be located outside of the predefined area 206 containing the image 202 and comments 204, for example beneath the predefined area 206.

The user input described above may cause all of the comments 204 which are currently visible to be moved backwards in the display order, revealing the layer of comments 204 underneath. Alternatively, the number of comments 204 which are swapped in this way may depend on the portion of a circle which the user traces on the touch sensitive display 104. The comments 204 are then moved backwards in the display order in reverse chronological order, beginning with the latest comment 212. In some embodiments, the number of comments 204 which are swapped in this way may depend on the speed at which a user traces a circle on the touch sensitive display 104. For example, the rate at which comments 204 are moved in the display order may be directly proportional to the speed of the user touch input. Alternatively, comments 204 may be moved in the display order one at a time when the user input is below a threshold speed and may be moved by whole layers at a time when the user input is above a threshold speed. In embodiments in which partially covered comments 204 are faded, moving a comment backwards in the display order may further comprise fading the comment 204.

In FIG. 4, a further screenshot 400 is shown. Screenshot 400 is of a display screen after a user input to show older comments 204 has been received at user input hardware 106. In FIG. 4, older comments 204, including the first comment 208 and second comment 210, are now visible. The most recent comments 204, including the latest comment 212, are now at least partially covered by the older comments 204.

The screenshot 400 also has a user input indicator 402, which may also be an arrow shaped as a circle or spiral in order to indicate that if a user performs a generally circular movement on the display 104 with a finger or stylus, a change in the displayed content will result. However, when the first comment 208 is visible, the user input indicator 402 may be a circular arrow pointing in a clockwise direction. The processor 102 is configured to detect when a user draws a clockwise circle on the touch sensitive display 104. In response, the older comments 204 are caused to move backwards in the display order and the more recently posted comments 204 are caused to move forward in the display order. Therefore newer comments 204 become visible and cover the older comments 204. In embodiments in which partially covered comments 204 are faded, moving a comment forwards in the display order may further comprise un-fading the comment 204.

Because new comments are posted in a clockwise direction, it is intuitive for a user of the computing device 100 to provide a touch input in a clockwise direction to view newer comments which are not visible. Therefore the functionality and convenience of the computing device 100 is increased. Another advantage of the above described features is that every comment 204 which has been posted with the image 202 (or other media or interface for a media player) can be viewed with the image 202 on the same display. This is particularly useful when the comment 204 refers to details of the image 202 and a user would otherwise have to flip or scroll multiple times between viewing the comment 204 and viewing the image 202.

The user input indicator 402 may be accompanied by a label, for example "show newer posts", to further indicate the responsiveness of the computing device 100 to a user input. The user input indicator 402 may be located outside of the predefined area 206 containing the image 202 and comments 204, for example beneath the predefined area 206.

In FIG. 3, the latest comment 212 is visible, along with several of the comments 204 which precede it chronologically. In FIG. 4, the first comment 208 is visible, along with several of the comments 204 which follow it chronologically. In between these two extremities, there may be a state in which neither the first comment 208 nor the latest comment 212 is visible. In these instances, both the anti-clockwise user input indicator 306 and the clockwise user input indicator 402 may be displayed in order to indicate that the computing device 100 is responsive to a circular touch input in either direction to cause a change in the comments 204 which are displayed.

In some embodiments, selectable page navigation graphics (not shown) may be displayed with the comments 204 and image 202. An object may have associated with it, a large number of comments 204. This may result in many layers, or pages, of overlapping comments 204. For example, in the embodiments shown in FIGS. 2-4, comments 1 to 6 comprise a first layer, or page, of comments 204 and comments 7 to 10 are part of a second layer of comments 204. The page navigation graphics may be Arabic numerals arranged sequentially and which a user may select in order to immediately view the corresponding page of comments 204. The page navigation graphics may additionally comprise a next and a previous page graphic which a user may select in order to view the next or previous page of comments 204 respectively. The page navigation graphics may further comprise a first and a last page graphic which a user may select in order to view the first or last page of comments 204 respectively. In situations where there are many pages of comments 204, it may be inconvenient for a user to have to provide a circular touch input in order to view much newer or older comments 204 than are currently visible. The page navigation graphics allow a user to skip several pages of comments 204 at once.

Exemplary operation of the computing device 100 will now be described with reference to the flow charts of FIGS. 5 and 6.

Figure 5:
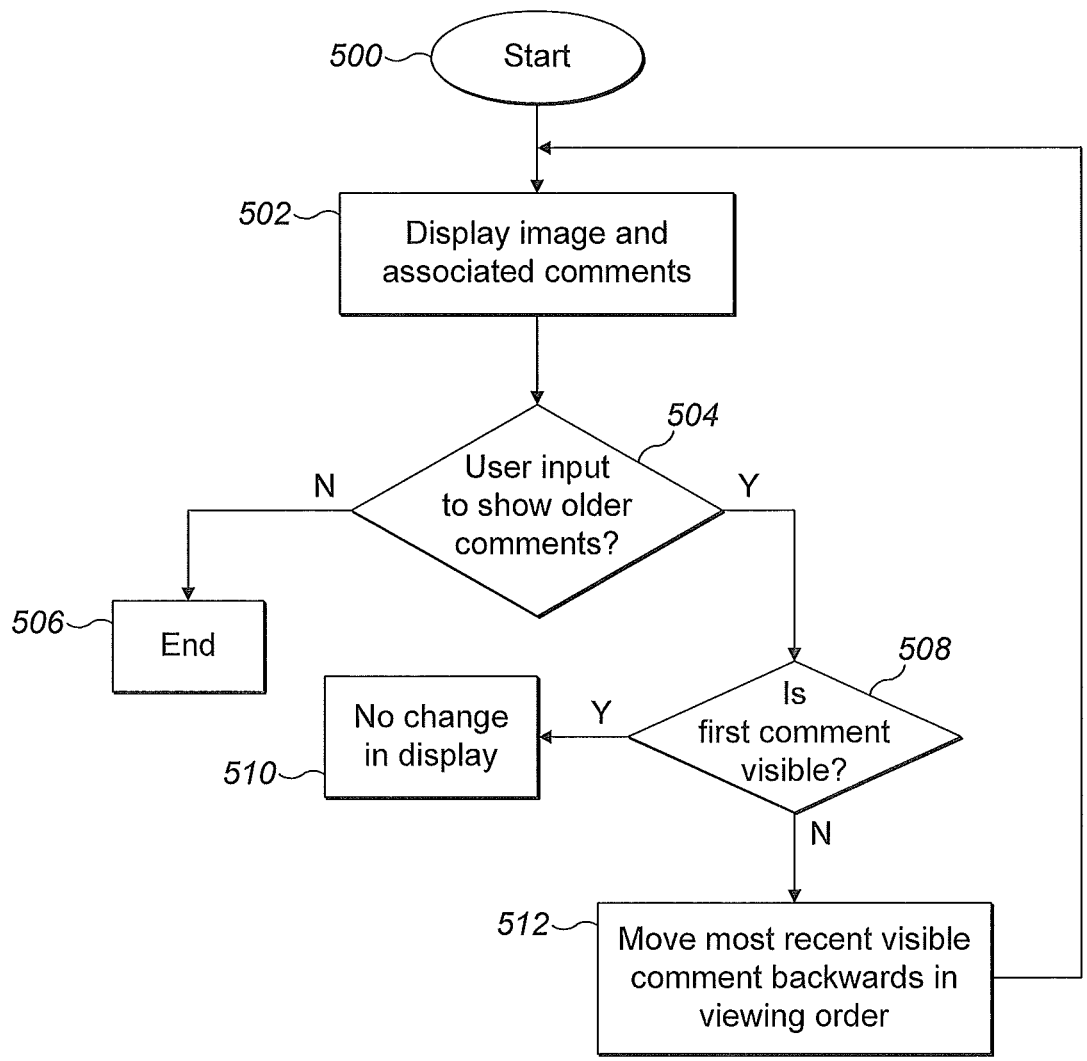
FIG. 5 is a flow chart depicting exemplary operation of the computing device of FIG. 1 according to various embodiments.

FIG. 5 depicts the process of showing older posts that are covered at least in part by newer posts. The process begins at step 500. At step 502 an image 202 and its associated comments 204 are displayed. In order to display the image 202 and comments 204, a user of computing device 100 may interact with user input hardware 106 to cause internet browser program 114 to be executed and to navigate to a web page hosting the image 202. The processor 202 controls step 502 by interpreting signals received from the user input hardware 106, sending and receiving control signals to/from internet browser program 114, controlling communication module 110 to send content download requests to a remote server storing the web page and controlling display 104 to display the web page. Alternatively, a user of computing device 100 may utilise the application 115 to download and view the image 202 and comments 204.

At step 504 it is determined if a user input to show older comments has been received. The processor 102 is configured to receive signals from user input hardware 106 and display 104 and to determine what type of user input has been entered. In the embodiments of FIGS. 2-4, the display 104 is a touch screen display, and the user input is a tactile input into the touch screen. As described above, the user input may be a generally circular tactile input with a finger or stylus. The processor may recognise an anti-clockwise touch input as a request to show older comments. However the processor 102 may alternatively or in addition be configured to recognise a keystroke, button press, gesture and/or voice command.

If no user input is received or an input is received which is not recognised by the processor 102 as a request to show older comments, then the process ends at step 506. No change in the appearance of the displayed content results.

If a user input to show older comments is received, it is determined at step 508 if the first comment 208 is visible. The processor 102 may perform step 508 by accessing the internet browser program 114 or application 115 or by reading metadata associated with the comments 204 which has been previously stored in the memory 112. For example, each comment 204 may have associated with it an "order tag". The order tag may be a simple reference number which determines the order in which overlapping comments 204 are displayed. If two comments 204 occupy some or all of the same space, the comment 204 having the lowest associated order tag is displayed on top, while the other comment 204 is at least partially hidden underneath.

If it is determined that the first comment 208 is visible then there are no older comments 204 which can be displayed and the process ends at step 510 with no change in displayed content. If it is determined that the first comment 208 is not visible then there are some older comments 204 which may be displayed and the process continues at step 512. In step 512 the most recent visible comment is moved backwards in the viewing order. The processor 102, under control of the application 115 or of software downloaded from a website hosting the image 202, may cause this change in viewing order by swapping the order tag numbers of the visible comment 204 with the highest posting number and an older comment which is at least partially covered by this comment 204. In a default configuration, the most recent visible comment 204 is the latest comments 212. After step 512, the process returns to step 504

Figure 6:
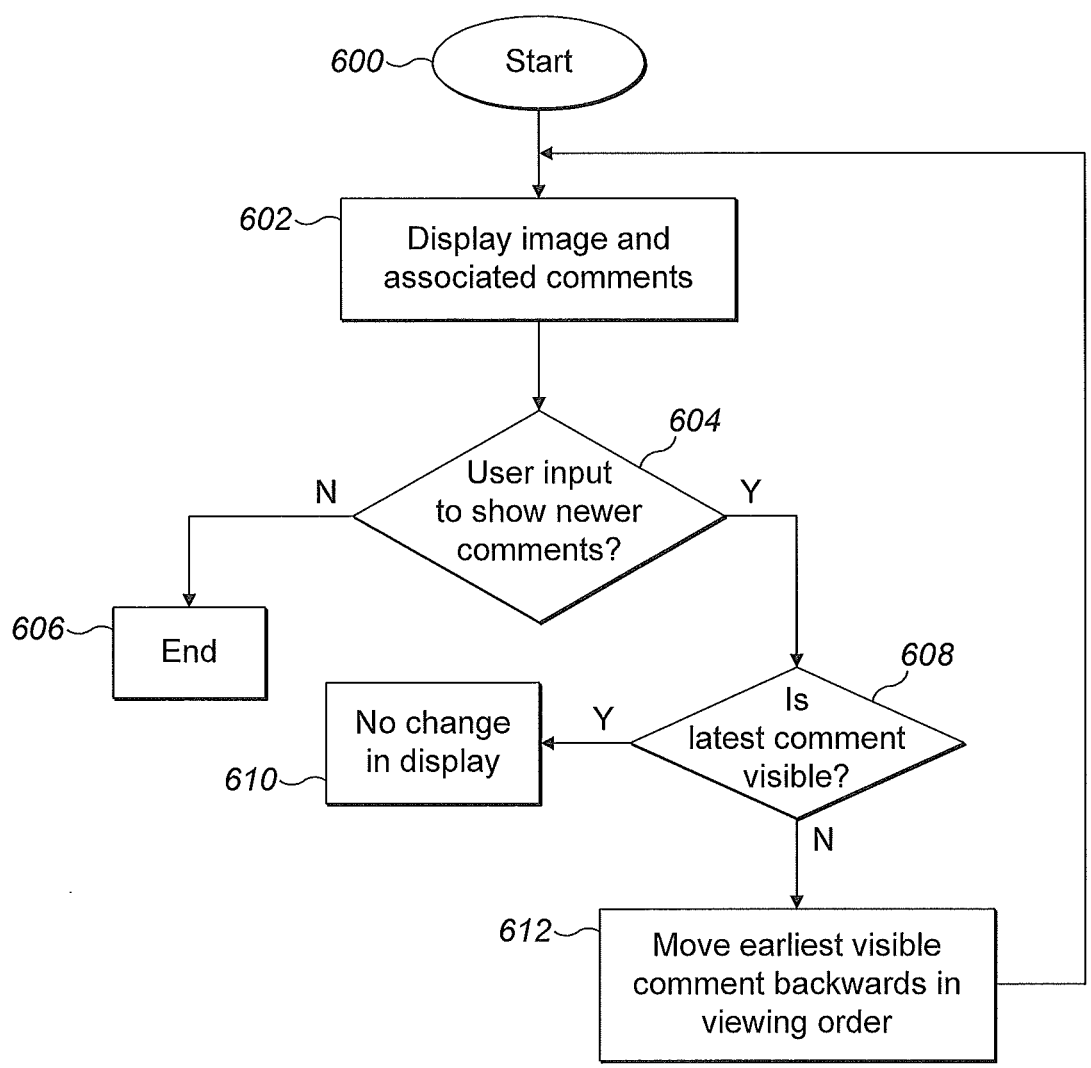
FIG. 6 is a flow chart depicting further exemplary operation of the computing device of FIG. 1 according to various embodiments.

FIG. 6 depicts the process of showing newer posts. The process begins at step 600. At step 602 an image 202 and its associated comments 204 are displayed. Step 602 is the same as step 502 of FIG. 5.

At step 604 it is determined if a user input to show newer comments has been received. The processor 102 is configured to receive signals from user input hardware 106 and display 104 and to determine what type of user input has been entered. As described above, the user input may be a generally circular tactile input with a finger or stylus. The processor may recognise a clockwise touch input as a request to show newer comments. However the processor 102 may alternatively or in addition be configured to recognise a keystroke, button press, gesture and/or voice command.

If no user input is received or an input is received which is not recognised by the processor 102 as a request to show newer comments, then the process ends at step 606. No change in the appearance of the displayed content results.

If a user input to show newer comments is received, it is determined at step 608 if the latest comment 212 is visible. The processor 102 may perform step 608 by accessing the internet browser program 114 or application 115 or by reading metadata associated with the comments 204 which has been previously stored in the memory 112, as described above with reference to FIG. 5.

If it is determined that the latest comment 212 is visible then there are no newer comments 204 which can be displayed. Therefore the process ends at step 610 with no change in displayed content. If it is determined that the latest comment 212 is not visible then there are some newer comments 204 which may be displayed. Therefore the process continues at step 612. In step 612 the earliest visible comment is moved backwards in the viewing order. The processor 102, under control of the application 115 or of software downloaded from a website hosting the image 202, may cause this change in viewing order by swapping the order tag numbers of the visible comment 204 with the lowest posting number and a newer comment which is at least partially covered by this comment 204. After step 612, the process returns to step 604.

In alternative embodiments to those shown in FIGS. 2-4, there may be a set number of spaces for comments 204 around the outside edge of the image 202. For example the image 202 may be surrounded by a number of text boxes, e.g. ten boxes. The boxes may be filled with comments 204 in a clockwise direction. After the last empty box is filled, the next comment 204 to be added replaces the first comment 208 entirely. A comment 204 which replaces another comment 204 entirely may be highlighted in some way, for example with a different box background colour or outline. Alternatively, the appearance of the text box itself may change such that a portion of the replaced comment box can be seen. A user input indicator or indicators (306, 402) may appear when some comments 204 which have been posted are no longer visible, and the computing device 100 may be responsive to a user input to show hidden comments as described with reference to FIGS. 5 and 6.

In other alternative embodiments to those shown in FIGS. 2-4, the comments 204 may not be disposed around the image 202, but may all be contained in an area below, above or beside the image 202. For example, a number of comment boxes may be arranged side by side in a row. The comment boxes may be filled with comments 204, as they are posted, from left to right. When all of the empty comment boxes are filled and a new comment is added all of the other comments 204 may move one box to the left such that the new comment 204 appears at the far right of the row and the first comment 208 is removed. An indicator may appear to inform a user that some comments are hidden and that the computing device 100 is responsive to an input to show these hidden comments 204. For example, the indicators may be arrows, located at the end of the row of comment boxes. The computing device 100 may be responsive to a left or right swipe touch input to show newer or older comments 204 respectively. Alternatively, the input may be a keystroke or gesture.

In some embodiments, the image 202 and comments 204 are viewed with a software application 115 which is not an internet browser. This software application 115 may be a proprietary application produced by an entity which hosts the image 202. For example, the application 115 may be provided by Nokia Corporation and may be configured to allow the computing device 100 to view images 202 and comments 204 hosted on the Ovi Share website, managed by Nokia Corporation. A display presented to a user when utilising the application 115 may be similar, in some aspects, to those shown in FIGS. 2 to 4. However, the image 202 and comments 204 may occupy a greater area of the display. Additionally, the application 115 may be better integrated with the other functions of the computing device 100 than the internet browser 114. This may result in more options, for example image sharing and editing options, being available to a user of the computing device 100. This may also allow an improved user experience, particularly when Internet connectivity is intermittent or slow.

It will be appreciated that the above described embodiments are purely illustrative and are not limiting on the scope of the invention. Other variations and modifications will be apparent to persons skilled in the art upon reading the present application. For example, although embodiments of the present invention have been described with reference to an image object, these embodiments are equally applicable where the object is a video or audio file or another type of media. Also, although the embodiments utilize a touchscreen to display information and receive user inputs, instead a user may provide inputs such as gestures on a projected image with the inputs being detected using a camera. In this case, a display may be considered to be constituted by a projector and a surface on which an image is projected.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

What is claimed is:

1. An apparatus comprising at least one processor and at least one memory having computer-readable code stored thereon which when executed controls the at least one processor:
to cause to be displayed, in a first area of a display, an object;
to cause to be displayed, in a second area of the display disposed around and outside of the first area of the display so as to encircle the first area of the display, a first comment associated with the object and a second comment associated with the object such that the first comment covers a portion of the second comment, wherein the second area is in a fixed location relative to the first area, wherein the comments are displayed in a clockwise order around the first area of the display based upon an order of receipt of the comments such that a more recently received comment is displayed in the second area of the display at a position offset in the clockwise order from a previously received comment;
to be responsive to an anti-clockwise dynamic tactile user input that is around the first area of the display and within the second area of the display to cause the second comment to cover a portion of the first comment such that the first comment is at least partially hidden; and
to be responsive to a clockwise dynamic tactile user input that is around the first area of the display and within the second area of the display to cause the first comment to cover the portion of the second comment such that the second comment is at least partially hidden.

2. The apparatus according to claim 1, wherein the anti-clockwise dynamic tactile user input within the second area of the display generally follows a shape of the second area of the display.

3. The apparatus according to claim 1, wherein the first comment has been more recently associated with the object than the second comment.

4. The apparatus according to claim 1 wherein, in an initial display configuration, the first comment is displayed in preference to at least a part of the second comment.

5. The apparatus as claimed in claim 1, wherein the comments are provided in a sequence around the first area of the display such that comments later in the sequence are displayed in preference to comments earlier in the sequence which are at the same part of the second area of the display, and wherein the anti-clockwise dynamic tactile user inputs-traces a shape of the second area of the display.

6. A method comprising:
displaying, in a first area of a display, an object;
displaying, in a second area of the display disposed around and outside of the first area of the display so as to encircle the first area of the display, a first comment associated with the object and a second comment associated with the object such that the first comment covers a portion of the second comment, wherein the second area is in a fixed location relative to the first area, wherein the comments are displayed in a clockwise order around the first area of the display based upon an order of receipt of the comments such that a more recently received comment is displayed in the second area of the display at a position offset in the clockwise order from a previously received comment;
responding to an anti-clockwise dynamic tactile user input within the second area of the display around the first area of the display to cause the second comment to cover a portion of the first comment such that the first comment is at least partially hidden; and
responding to a clockwise dynamic tactile user input within the second area of the display around the first area of the display to cause the first comment to cover the portion of the second comment such that the second comment is at least partially hidden.

7. The method according to claim 6, wherein the anti-clockwise tactile user input within the second area of the display generally follows a shape of the second area of the display.

8. The method according to claim 6, wherein the first comment has been more recently associated with the object than the second comment.

9. The method according to claim 6, comprising, in an initial display configuration, displaying the first comment in preference to at least a part of the second comment.

10. The method according to claim 6, wherein the comments are provided in a sequence around the first area of the display such that comments later in the sequence are displayed in preference to comments earlier in the sequence which are at the same part of the second area of the display, and wherein the anti-clockwise tactile user input traces a shape of the second area of the display.

11. A non-transitory computer-readable storage medium having stored thereon computer-readable code, which, when executed by computing apparatus, causes the computing apparatus to perform a method comprising:
displaying, in a first area of a display, an object;
displaying, in a second area of the display disposed around and outside of the first area of the display so as to encircle the first area of the display, a first comment associated with the object and a second comment associated with the object such that the first comment covers a portion of the second comment, wherein the second area is in a fixed location relative to the first area, wherein the comments are displayed in a clockwise order around the first area of the display based upon an order of receipt of the comments such that a more recently received comment is displayed in the second area of the display at a position offset in the clockwise order from a previously received comment;
responding to an anti-clockwise dynamic tactile user input within the second area of the display around the first area of the display to cause the second comment to cover a portion of the first comment such that the first comment is at least partially hidden; and
responding to a clockwise dynamic tactile user input within the second area of the display around the first of the display to cause the first comment to cover the portion of the second comment such that the second comment is at least partially hidden.

12. The apparatus of claim 1, wherein the causation of the second comment to cover a portion of the first comment such that the first comment is at least partially hidden is performed such that another portion of the second comment is visible.

13. The apparatus of claim 1, wherein the display, in the second area of the display, of the second comment without moving the object on the display such that the second comment covers a portion of the first comment, is performed such that another portion of the first comment is visible.

14. The apparatus of claim 1, wherein the first comment was more recently associated with the object than the second comment and a plurality of other comments were associated with the object subsequent to the second comment being associated with the object and subsequent to the first comment being associated with the object, wherein the causation of display of the first comment and the second comment is performed such that the first comment, the plurality of other comments, and the second comment are displayed in the second area of the display in clockwise order according to a time when each of the first comment, the plurality of other comments, and the second comment were associated with the object such that the clockwise order results in the first comment covering the portion of the second comment.

15. The method according to claim 6, wherein the causation of the second comment to cover a portion of the first comment such that the first comment is at least partially hidden is performed such that another portion of the second comment is visible.

16. The method according to claim 6, wherein the display, in the second area of the display, of the second comment without moving the object on the display such that the second comment covers a portion of the first comment, is performed such that another portion of the first comment is visible.

17. The method according to claim 6, wherein the first comment was more recently associated with the object than the second comment and a plurality of other comments were associated with the object subsequent to the second comment being associated with the object and subsequent to the first comment being associated with the object, wherein the causation of display of the first comment and the second comment is performed such that the first comment, the plurality of other comments, and the second comment are displayed in the second area of the display in clockwise order according to a time when each of the first comment, the plurality of other comments, and the second comment were associated with the object such that the clockwise order results in the first comment covering the portion of the second comment.

18. The medium according to claim 11, wherein the causation of the second comment to cover a portion of the first comment such that the first comment is at least partially hidden is performed such that another portion of the second comment is visible.

19. The medium according to claim 11, wherein the display, in the second area of the display, of the second comment without moving the object on the display such that the second comment covers a portion of the first comment, is performed such that another portion of the first comment is visible.

20. The medium according to claim 11, wherein the first comment was more recently associated with the object than the second comment and a plurality of other comments were associated with the object subsequent to the second comment being associated with the object and subsequent to the first comment being associated with the object, wherein the causation of display of the first comment and the second comment is performed such that the first comment, the plurality of other comments, and the second comment are displayed in the second area of the display in clockwise order according to a time when each of the first comment, the plurality of other comments, and the second comment were associated with the object such that the clockwise order results in the first comment covering the portion of the second comment.

21. The apparatus as claimed in claim 1, wherein the at least one processor is further controlled to cause a user input indicator representative of a responsiveness to at least one of the clockwise dynamic tactile user input or the anti-clockwise dynamic tactile user input to be displayed only once the comments are displayed in a manner so as to be at least partially overlapped.

22. The apparatus as claimed in claim 1, wherein the at least one processor is further controlled to be responsive to the dynamic tactile user input to cause all comments that are fully visible to be at least partially hidden by other comments.

23. The apparatus as claimed in claim 1, wherein the at least one processor is further controlled to be responsive to the dynamic tactile user input to cause a number of comments that are fully visible to be at least partially hidden by other comments with the number of comments being based upon a characteristic of the dynamic tactile user input.

24. The apparatus as claimed in claim 23, wherein the characteristic of the dynamic tactile user input comprises an extent of the dynamic tactile user input or a speed of the dynamic tactile user input.

25. The apparatus as claimed in claim 23, wherein the at least one processor is further controlled to be responsive to the dynamic tactile user input to cause a single comment that was fully visible to be at least partially hidden by another comment in an instance in which a speed of the dynamic tactile user input has a first relationship with respect to a threshold speed and to cause all comments that are fully visible to be at least partially hidden by other comments in an instance in which the speed of the dynamic tactile user input has a second relationship, different than the first relationship, with respect to the threshold speed.

26. The apparatus as claimed in claim 1, wherein the at least one processor is further controlled to cause a change in viewing order of the comments by changing order tag numbers associated with the respective comments.

27. The method as claimed in claim 6, further comprising causing a user input indicator representative of a responsiveness to at least one of the clockwise dynamic tactile user input or the anti-clockwise dynamic tactile user input to be displayed only once the comments are displayed in a manner so as to be at least partially overlapped.

28. The method as claimed in claim 6, further comprising causing, in response to the dynamic tactile user input, all comments that are fully visible to be at least partially hidden by other comments.

29. The method as claimed in claim 6, further comprising causing, in response to the dynamic tactile user input, a number of comments that are fully visible to be at least partially hidden by other comments with the number of comments being based upon a characteristic of the dynamic tactile user input.

30. The method as claimed in claim 29, wherein the characteristic of the dynamic tactile user input comprises an extent of the dynamic tactile user input or a speed of the dynamic tactile user input.

31. The method as claimed in claim 29, further comprising causing, in response to the dynamic tactile user input, (i) a single comment that was fully visible to be at least partially hidden by another comment in an instance in which a speed of the dynamic tactile user input has a first relationship with respect to a threshold speed and (ii) all comments that are fully visible to be at least partially hidden by other comments in an instance in which the speed of the dynamic tactile user input has a second relationship, different than the first relationship, with respect to the threshold speed.

32. The method as claimed in claim 6, further comprising causing a change in viewing order of the comments by changing order tag numbers associated with the respective comments.

* * * * *